US009769317B2

(12) United States Patent
Albert et al.

(10) Patent No.: US 9,769,317 B2
(45) Date of Patent: Sep. 19, 2017

(54) CONFERENCE SYSTEM WITH ENHANCED SECURITY AND AUTHENTICATION

(71) Applicant: AT&T INTELLECTUAL PROPERTY I, L.P., Atlanta, GA (US)

(72) Inventors: Grant Albert, Raritan, NJ (US); David Lawcock, Guilford, CT (US); Lori Essex, Hawley, PA (US); Robert Stokey, Jr., Manville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 196 days.

(21) Appl. No.: 14/055,287

(22) Filed: Oct. 16, 2013

(65) Prior Publication Data

US 2015/0103991 A1    Apr. 16, 2015

(51) Int. Cl.
*H04M 3/56*      (2006.01)
*H04M 3/38*      (2006.01)

(52) U.S. Cl.
CPC ............. *H04M 3/56* (2013.01); *H04M 3/382* (2013.01); *H04M 2203/6081* (2013.01); *H04M 2242/14* (2013.01)

(58) Field of Classification Search
CPC ....... H04M 3/56; H04M 3/42; H04M 2242/30
USPC .................................................. 379/202.01
See application file for complete search history.

(56) References Cited

U.S. PATENT DOCUMENTS

| | | |
|---|---|---|
| 5,333,185 A | 7/1994 | Burke et al. |
| 5,506,894 A | 4/1996 | Billings et al. |
| 5,758,079 A | 5/1998 | Ludwig et al. |
| 6,122,502 A | 9/2000 | Grundvig et al. |
| 6,434,226 B1 | 8/2002 | Takahashi |
| 6,611,587 B2 | 8/2003 | Brown et al. |
| 6,701,160 B1 | 3/2004 | Pinder et al. |
| 6,801,615 B2 | 10/2004 | Stumer et al. |
| 7,466,809 B2 | 12/2008 | Carnazza et al. |
| 7,532,715 B2 | 5/2009 | Miller |
| 7,764,778 B2 | 7/2010 | Allen et al. |

(Continued)

FOREIGN PATENT DOCUMENTS

JP    11275206    10/1999

*Primary Examiner* — Ahmad F. Matar
*Assistant Examiner* — Jirapon Intavong
(74) *Attorney, Agent, or Firm* — Greenblum & Bernstein, P.L.C.

(57) ABSTRACT

A system receives, at a conference platform, a communication from a communications device of a requester requesting to host an audio conference. The system determines whether an access code provided by the requester is a valid access code associated with a provider communications address specified by the requester. A processor identifies a country from which the communication of the requester originated and determines whether the country from which the communication of the requester originated is a pre-authorized country, associated with a host account, from which to host the global audio conference. An audio conference is established when the access code specified by the requester is determined to be a valid access code associated with the provider communications address specified by the requester and when the country from which the communication of the requester originated is determined to be a pre-authorized country from which to host the audio conference.

19 Claims, 9 Drawing Sheets

(56) References Cited

U.S. PATENT DOCUMENTS

| | | | |
|---|---|---|---|
| 7,957,772 B2 | 6/2011 | Charlier et al. | |
| 8,208,000 B1* | 6/2012 | Swanson et al. | 348/14.08 |
| 8,238,536 B1 | 8/2012 | Kavulak et al. | |
| 8,325,905 B2 | 12/2012 | Gregorat et al. | |
| 8,401,167 B2 | 3/2013 | Allen et al. | |
| 8,576,750 B1* | 11/2013 | Hecht | H04M 3/56 370/261 |
| 2003/0048889 A1* | 3/2003 | Marchead et al. | 379/114.14 |
| 2003/0065722 A1* | 4/2003 | Ieperen | G06F 21/31 709/205 |
| 2003/0072428 A1* | 4/2003 | Stern et al. | 379/202.01 |
| 2005/0071417 A1* | 3/2005 | Taylor et al. | 709/200 |
| 2005/0233737 A1* | 10/2005 | Lin | 455/416 |
| 2006/0105790 A1 | 5/2006 | Jin et al. | |
| 2009/0197621 A1 | 8/2009 | Book | |
| 2011/0007887 A1* | 1/2011 | Green et al. | 379/203.01 |
| 2011/0033034 A1* | 2/2011 | Mani | H04M 3/56 379/202.01 |
| 2011/0135081 A1* | 6/2011 | Lingafelt et al. | 379/203.01 |
| 2011/0271332 A1* | 11/2011 | Jones | H04L 9/3247 726/7 |
| 2012/0300768 A1 | 11/2012 | Huang et al. | |

* cited by examiner

Figure 6

| Host Account Name 601 | Service Provider Conference Communications Address 602 | Leader Access Code 603 | Participant Access Code 604 | Country 605 | First Communications Address 606 | IP Address 607 | Second Communications Address 608 |
|---|---|---|---|---|---|---|---|
| Bob Smith | xxx-xxx-xxxx | 58236474# | 23748169# | Italy<br>Germany<br>Japan | xxx-xxx-xxxx | xxx.xxx.xxx.xxx | xxx@xxx.com |
| Sequence 609 | --- | --- | --- | 1 | 3 | 2 | 4 |
| Add Border(s) 610 | --- | --- | --- | √ | --- | --- | --- |

600

CONFERENCE SYSTEM WITH ENHANCED SECURITY AND AUTHENTICATION

BACKGROUND

1. Field of the Disclosure

The present disclosure relates to the field of telecommunications. More particularly, the present disclosure relates to an audio conference system, a method of providing an audio conference system having enhanced security and authentication, and a method of provisioning the audio conference system with enhanced security and authentication.

2. Background Information

Global audio conference services are offered by service providers for persons to host conference calls. Often times, companies enlist the services of service providers so that the employees of the companies can host conference calls with other participants. For various reasons, the employees may attempt to host conference calls with participants from different countries. Generally, the employee dials an in-country telephone number, assigned to the conference bridge by the service provider, and after a prompt, the employee enters a host access code, sometimes referred to as a leader access code. Participants also dial into an in-country telephone number and enter a participant access code to join the conference call initiated by the host. Participants dialing in before the host does so are typically placed in queue or on hold until the host dials in. Once the host dials in, the participants on hold are joined with the host on a conference call. There are two different call flows. That is, in a first, the host and participant use the same access code and then then host enters an additional host access code. In a second, the host and participant enter unique access codes. The host enters a host code and the participant enters a participant code. In a typical scenario, a prompt instructs "if you are the host, press the star key". After the host presses the star key, the host is prompted to enter the host code, and the conference begins once the host code is entered. For each of the two call flows, the host is identified by the authentication system.

Unfortunately, audio conference services are subject to fraud, and global audio conference services are no exception. Audio Conference Services, also known as Global Audio Conference Services, provide in-country local phone numbers for callers in those countries to dial and join the conference call. Global audio conference services provide a subset of in-country telephone numbers, where a company can often request additional telephone numbers if they have host and/or participants from those countries.

With respect to global audio conference services in particular, hackers have employed automated dialing systems that are used to determine the access codes associated with a conference call number of a service provider. Once the hackers obtain a valid access code, they can host numerous unauthorized conference calls and generate a great deal of charges. In addition to the financial aspect associated with this fraudulent practice, some of the unauthorized conferences calls may be used for unscrupulous or illegal activities, possibly including relating to terrorism. Further unauthorized conference calls can consume carrier resources, taking resources away from authorized conference calls.

As there are millions of conference calls hosted by employees of customers each month, it is very difficult for the company to distinguish authorized conference calls from unauthorized conference calls. As a result, service providers can unknowingly charge its customers for unauthorized conference calls. Consequently, service providers risk losing customers if its customers become aware or suspect that they are being billed for unauthorized conference calls. Further, the reputation of the service provider is at stake if customers and potential customers believe that its conference call service is not secure or is at risk for hacking or other illegal activities.

To date, attempts at solving the problem have been the use of a phone number with an access code. The access codes can include a minimum and maximum string of digits. Sometimes the access codes expire after a certain period of time, forcing users to periodically select new access codes. Other measures have included preventing sequential or repeating of digits within the string of access code digits, and preventing the use of previously used access codes. While helpful, these methods have not eliminated hackers from acquiring access codes and hosting unauthorized conference calls. What is needed is a conference system having enhanced security and authentication protocols.

BRIEF DESCRIPTION OF THE DRAWINGS

FIG. 6 shows an exemplary host profile management interface, according to an aspect of the present disclosure;

DETAILED DESCRIPTION

Figure 1:
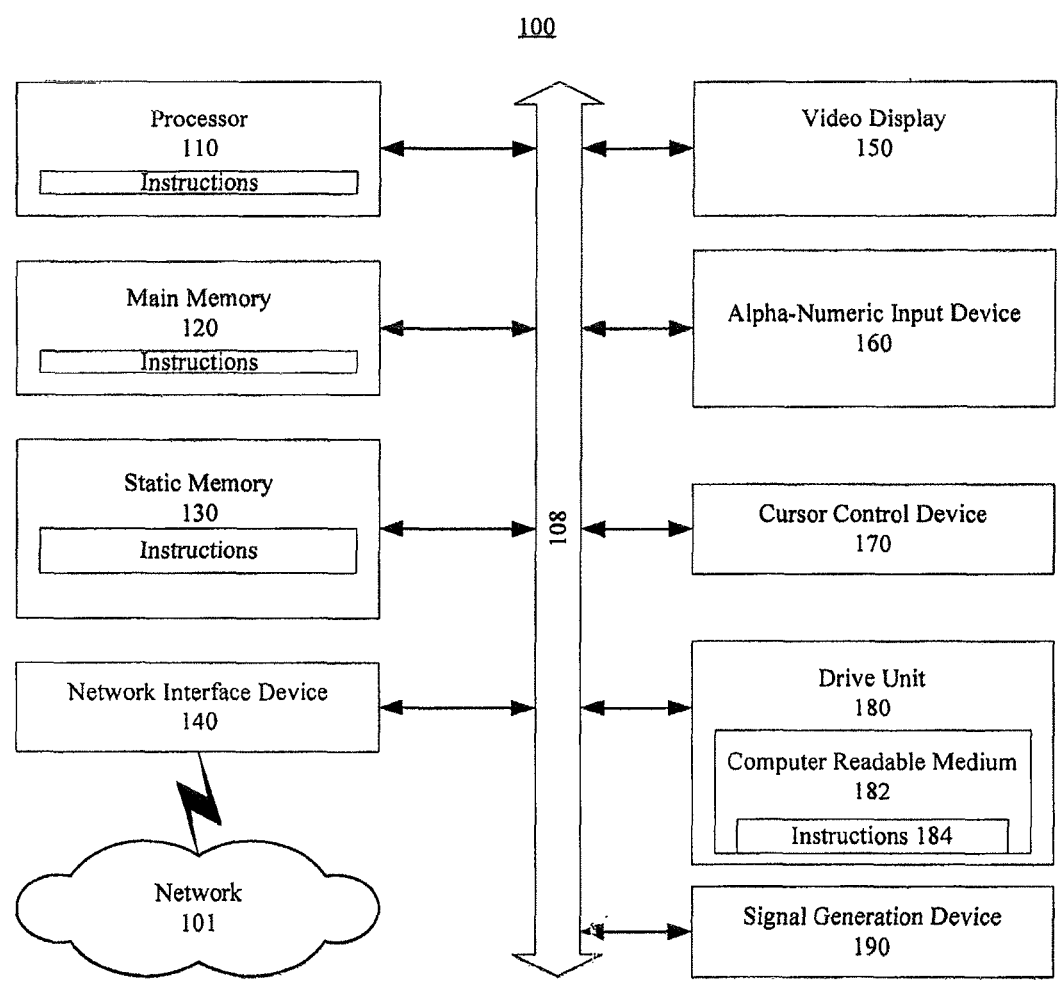
FIG. 1 shows an exemplary general computer system that includes a set of instructions for a global audio conference system.

In view of the foregoing, the present disclosure, through one or more of its various aspects, embodiments and/or specific features or sub-components, is thus intended to bring out one or more of the advantages as specifically noted below. It should be appreciated that like reference numerals are used to identify like or similar elements illustrated in one or more of the figures.

According to an aspect of the present disclosure, a method is provided for of authenticating a request to host a conference in a communications network. The method includes receiving, at a conference platform, a communication from a communications device of a requester requesting to host a global audio conference, the communication including an access code specified by the requester, determining whether the access code is a valid access code associated with a provider communications address specified by the requester, identifying, with a processor, a country from the which the communication of the requester originated, determining, with the processor, whether the country from which the communication of the requester originated is a pre-authorized country, associated with a host account, from which to host the global audio conference, and establishing the global audio conference when the access code specified by the requester is determined to be a valid access code associated with the provider communications address specified by the requester and when the country from which the communication of the requester originated is determined to be a pre-authorized country, associated with the host account, from which to host the global audio conference.

The method may further include identifying a communications address associated with the requester of the communication and determining whether the communications address associated with the requester of the communication is a pre-authorized communications address from which to host the global audio conference. Still further, the method may also include identifying an internet protocol address associated with the communication, and determining whether the internet protocol address associated with the communication is a pre-authorized internet protocol address from which to host the global audio conference. Additionally, the method may further include identifying a second communications address associated with the requester of the communication, and determining whether the second communications address associated with the requester of the communication is a pre-authorized second communications address associated with the host account.

The method may also include identifying an originating country associated with the internet protocol address using geo-location data. The country from which the communication of the requester originated may be determined with a dialed number identification service (DNIS). The country from which the communication of the requester originated may be determined by extracting a country code from an e.164 number associated with the communication from the requester. The communications address of the requester includes an originating phone number. The second communications address of the requester includes an email address, and the second communications address is obtained by prompting the requester. The method may also include authenticating a conference invitee using one of a name and an email address identified using computer network login credentials.

According to another aspect of the present disclosure, a system is provided for authenticating a request to host an audio conference in a communications network. The system includes a memory that stores executable instructions, and a processor that executes the executable instructions. The system receives, at a conference platform, a communication from a communications device of a requester requesting to host a global audio conference, the communication including an access code specified by the requester. Also, the system determines whether the access code is a valid access code associated with a provider communications address specified by the requester. Further, the system identifies a country from which the communication of the requester originated and determines whether the country from which the communication of the requester originated is a pre-authorized country, associated with a host account, from which to host the global audio conference. Additionally, the system establishes the global audio conference when the access code specified by the requester is determined to be a valid access code associated with the provider communications address specified by the requester and when the country from which the communication of the requester originated is determined to be a pre-authorized country, associated with the host account, from which to host the global audio conference.

According to yet another aspect of the present disclosure, a tangible computer readable storage medium encoded with an executable computer program is provided that authenticates a request to host a conference in a communications network and that, when executed by a processor, causes the processor to perform operations including receiving, at a conference platform, a communication from a communications device of a requester requesting to host a global audio conference, the communication including an access code specified by the requester, determining whether the access code is a valid access code associated with a provider communications address specified by the requester, identifying, with a processor, a country from the which the communication of the requester originated, determining, with the processor, whether the country from which the communication of the requester originated is a pre-authorized country, associated with a host account, from which to host the global audio conference, and establishing the global audio conference when the access code specified by the requester is determined to be a valid access code associated with the provider communications address specified by the requester and when the country from which the communication of the requester originated is determined to be a pre-authorized country, associated with the host account, from which to host the global audio conference.

Additional operations performed include identifying a communications address associated with the requester of the communication, and determining whether the communications address associated with the requester of the communication is a pre-authorized communications address from which to host the global audio conference. Further, other operations performed are identifying an internet protocol address associated with the communication, and determining whether the internet protocol address associated with the communication is a pre-authorized internet protocol address from which to host the global audio conference. Still further, other operations performed are identifying a second communications address associated with the requester, and determining whether the second communications address associated with the requester of the communication is a pre-authorized second communications address associated with the host account.

The pre-authorized country includes a country selected by a host of the host account and a country bordering the country selected by the host. The country from which the communication of the requester originated is determined with a dialed number identification service (DNIS). The country from which the communication of the requester originated is determined by extracting a country code from an e.164 number associated with the communication from the requester. In addition, the communications address of the requester comprises an originating phone number. Also, the second communications address of the requester comprises an email address.

FIG. 1 is an illustrative embodiment of a general computer system, on which a secure audio conferencing system with enhanced security and authentication can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a touchscreen or keyboard, and a cursor control device 170, such as a mouse or trackball. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

For the purposes of the present application, the term communications address includes but is not limited to a phone number, telephone number, email address, internet protocol (IP) address, uniform resource locator (URL), etc. Further, the present application is not only limited to deterring and reducing hacking activities related global audio conferences, but applies equally to domestic audio conferences.

Figure 2:
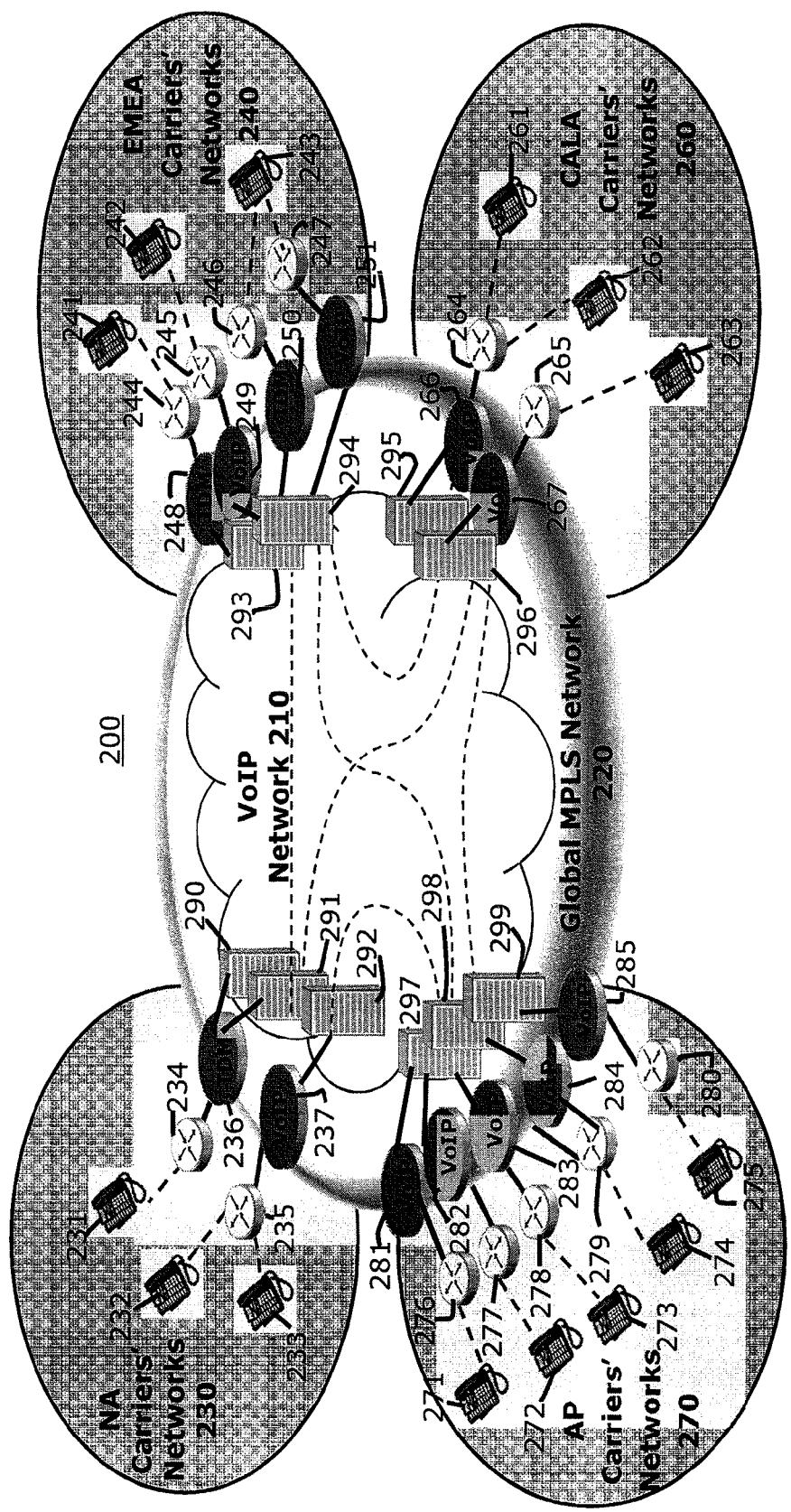
FIG. 2 shows an exemplary global communications network upon which a global audio conference is implemented, according to an aspect of the present disclosure.

FIG. 2 illustrates an exemplary global communications network. The global communications network 200 includes a service provider voice over IP (VoIP) network 210 and a service provider global multiprotocol label switching (MPLS) network 220. Additionally, the global communication network 200 includes IP conference platforms for North America (NA) 290, 291, 292, IP conference platforms for Europe, the Middle East, and Africa (EMEA) 293, 294, IP conference platforms for central and Latin America (CALA) 295, 296, and IP conference platforms for Asia-Pacific (AP) 297, 298, 299. Any number of IP conference platforms may be provided for any of the aforementioned regions. Further, any of the aforementioned regions (US, EMEA, CALA, AP) may be sub-divided into smaller regions with each small region having its own conference platforms.

Signaling in the MPLS network 220 includes, but is not limited to label distribution protocol (LDP), resource reservation protocol-traffic engineering (RSVP-TE), and border gateway protocol (BGP). Exemplary MPLS networks include Layer 3 BGP/MPLS-VPNs based on RFC 2547 and Layer 2 VPNs. Other suitable networks adapted to carry real-time traffic including voice and/or video are also contemplated, including generalized MPLS (GMPLS) and traditional IP networks.

Signaling in the VoIP network 210 includes, but is not limited to H.323, media gateway control protocol (MGCP), session initiation protocol (SIP), media gateway control or H.248, real-time transport protocol (RTP), real-time transport control protocol (RTCP), secure real-time transport protocol (SRTP), session description protocol (SDP), inter-asterisk eXchange (IAX), jingle XMPP VoIP extensions, and skype protocol.

The NA IP conference platforms 290, 291, 292 receive VoIP and TDM circuit switched communications from North American carrier network switches 234, 235. The EMEA IP conference platforms 293, 294 receive VoIP and TDM circuit switched communications from EMEA carrier network switches 244, 245, 246, 247. The CALA IP conference platforms 295, 296 receive VoIP and TDM circuit switched communications from CALA carrier network switches s 264, 265. The AP IP conference platforms 297, 298, 299 receive VoIP and TDM circuit switched calls from AP carrier network switches 276, 277, 278, 279, 280.

More specifically, a VoIP carrier access node 237 interfaces the NA carrier network 235 via physical access circuits with IP conference platform 292. Similarly, a TDM carrier access node 236 interfaces the respective NA carrier network switches 234 and 235 with one of the IP conference platforms 290, 291. User communications devices 231, 232, and 233 access the carrier network switches 234, 235 in known manners including voice and data call routes. Of course, any number of carrier access nodes, carrier networks, and/or IP conference platforms may be provided.

VoIP carrier access nodes 249 and 251 interface the EMEA carrier network switches 245 and 247 via physical access circuits with one of the IP conference platforms 293 and 294. Similarly, TDM carrier access nodes 248 and 250 interface the respective EMEA carrier network switches 244, 246 with one of the conference platforms 293 or 294. User devices 241, 242, 243 access the carrier network switches 244, 245, 246, and 247 in known manners including voice and data call routes. Of course, any number of carrier access nodes, carrier networks, and/or IP conference platforms may be provided, and the number illustrate herein is for exemplary purposes.

VoIP carrier access nodes 266 and 267 interface the CALA carrier network switches 264 and 265 via physical access circuits with one of the IP conference platforms 295 and 296. TDM carrier access nodes may also be implemented in a substantially similar fashion to that discussed above with respect to the North America and EMEA networks. User devices 261, 262, 263 access the carrier network switches 264, 265 in known manners including voice and data call routes. Of course, any number of carrier access nodes, carrier networks, and/or conference platforms may be provided, and the number illustrate herein is for exemplary purposes.

VoIP carrier access nodes 281, 282, 283, 284, and 285 interface the Asian Pacific network switches 276, 277, 278, 279, and 280 via physical access circuits with one of the IP conference platforms 297, 298, or 299. TDM carrier access nodes may also be implemented in a substantially similar fashion to that discussed above with respect to the North America and EMEA networks. User devices 271, 272, 273, 274, and 275 access the carrier network switches 276, 277, 278, 279, 280 in known manners including voice and data call routes. Of course, any number of carrier access nodes, carrier networks, and/or IP conference platforms may be provided, and the number illustrate herein is for exemplary purposes.

Audio and video conferencing systems are commonly used in connecting multiple participants in a single communications session. Typically, in such systems, the participants receive a call-in number and access code for calling the conference bridge. One of the participants is designated the conference leader and is known as the host. All of the participants dial in to the bridge at the appointed time. The conference begins when the leader comes on line (and ends if and when the leader drops off the call). There exists also a less secure conference option for the conference to begin without the host joining. This setting can be controlled by the host to enable or disable as desired. The bridge is responsible for mixing and distributing the audio and/or video signals from all of the participants into a single, stream, which it then distributes to all the participants.

The user devices discussed above are employed with appropriate hardware and software necessary to place PSTN communications, VoIP communications, video communications, online communications, and virtual communications, and may be placed via the PSTN, satellite networks, wired networks, wireless networks, cable networks, cellular networks, mobile networks, VoIP networks, etc. In this regard, any of the aforementioned user devices 231, 232, 233, 241, 242, 243, 261, 262, 263, 271, 272, 273, 274, and 275 discussed with respect to FIG. 2 may include a landline phone, an analog telephone adaptor (ATA) with analog phone, an IP phone including one with an RJ-45 ethernet connector, a Wi-Fi phone, a smart phone, a PDA, a tablet, a laptop, a netbook, a notebook computer, a desktop computer, a cellular phone, a mobile phone, a satellite phone, a GPS device, a gaming device, a smart tv, or other processing device containing communications hardware and software used to communicate over one or more communications networks.

Figure 3:
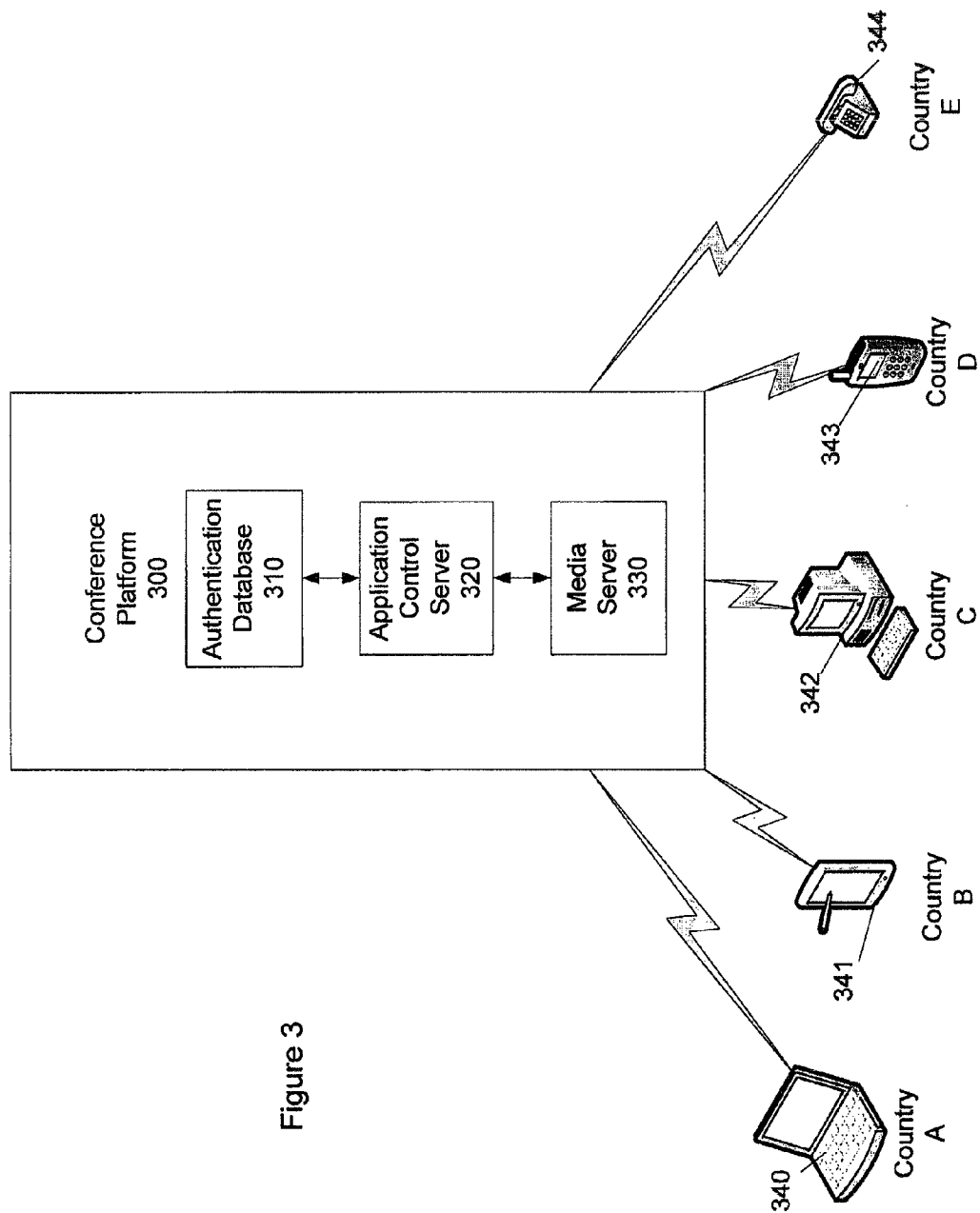
FIG. 3 shows an exemplary conference platform schematic, according to an aspect of the present disclosure.

FIG. 3 illustrates an exemplary conference platform schematic according to an aspect of the present disclosure. The conference platform 300 includes an authentication database 310, an application control server 320, and a media server 330.

The authentication database 310 stores information including audio conference communications addresses (e.g., telephone numbers, IP addresses, URLs, etc.) to which the user (requester) initiates a communication to request to host an audio conference and associated access codes, for each host (i.e., user). In this regard, the communications addresses can include a phone number, uniform resource locator, IP address, email address, etc. Additionally, participant access codes are also stored in the authentication database 310 for each of the audio conference communications addresses used to join an audio conference as a participant. The communications addresses, access codes, and participant access codes are typically, but not necessarily entered by an agent of the service provider or agent of the company on behalf of the host, as will be discussed in greater detail below. The authentication database 310 also includes an identification of pre-authorized countries specified by the host, an identification of at least one pre-authorized first communications address such as a telephone number, an identification of at least one pre-authorized internet protocol (IP) address, and an identification of at least one pre-authorized second communications address such as a participant name or an email address. As will be discussed below, the user that will later request to host audio conferences pre-authorizes data in these pre-authorized fields via a graphical user interface, so that the user can later request and be permitted to host audio conferences. Conversely, individuals other than the user associated with the host account will be precluded from hosting an audio conference with the service provider communications address associated with the user's account, even if they are able to identify a provider communication address and hack an associated access code.

The application control server 320 queries the authentication database 310 to validate access codes. That is, in response to a user requesting to host a audio conference, the application control server will compare the access code specified by the requester with an access code stored in the authentication database 310 for the particular communications address (e.g., telephone number of the service provider's conference call line) specified by the user to initiate the audio conference. Subsequently, after the access code is validated, the application control server 320 validates the other authentication security controls, including the country from which the user is originating the communication to attempt to host an audio conference, a communications address such as a phone number associated with a user device of the user, an IP address associated with the communications device of the user, participant name, and/or one or more email addresses associated with the user. This information is also stored in the authentication database 310, and is compared by the application control server 320 with information obtained as a result of the communication of the user requesting to host an audio conference. An exemplary application control server 320 includes large scale high performance transactions on application control software on a computer performing the authentication functions.

The application control server 320 instructs the media server 330 to answer the communication placed by the user to an audio conference communications address specified by a service provider to request an audio conference. After the communication from the user is answered by the media server 330, the control server 320 instructs the media server 330 to play a welcome announcement to the user. An exemplary welcome announcement is "Welcome to the Audio Conference service. Please enter or say your access code". After the welcome announcement is played to the user, which instructs the user to specify an access code, the media server 330 receives the access code and forwards the access code to the application control server 320. Alternatively, the access code may be received by the application control server 320 directly, without first being received by the media server 330. As noted, the application control server 320 will compare the access code specified by the requester with an access code stored in the authentication database 310 for the particular communications address (e.g., telephone number of the service provider's conference call line) specified by the requester to initiate the audio conference. Similarly, the application control server 320 will compare the country from which the communication of the requester originated against the pre-authorized countries. Depending upon how the host has provisioned the host account, the application control server 320 will also compare one or more of the communications address associated with the requester against the pre-authorized communications addresses stored in the authentication database 310, the IP address associated with the requester against the pre-authorized IP addresses stored in the authentication database 310, and a second communications address associated with the requester user against the pre-authorized addresses stored in the authentication database 310. Thus, the application control server 320 can ascertain whether the requester requesting to initiate the audio conference is actually the authorized host associated with the host account prior to establishing the conference bridge.

As referred to, the access code may be specified by requester using dual-tone multi-frequency DTMF signaling tones, or alternatively, the access code be specified by the requester by voice input. Alternatively, the access code may be specified by the requester via IP signaling. The media server 330 and or application control server 320 can include a processor with speech recognition capabilities, or be connected to a processor with speech recognition capabilities.

The media server 330 also performs the conferencing function by bridging the communications initiated by participants to the audio conference initiated by the leader (i.e. host), in response to validating the request of the requester. The media server 330 is a digital signal processor (DSP). Alternatively, the media server 330 may be a host media processor (HMP). While the DSP or HMP implementations eliminate the need for a separate interactive voice response (IVR) unit, an interactive voice response unit is also contemplated as the media server, or as an adjunct to the media server and/or application server. With the DSP and HMP implementations, the media server 330 performs voice conferencing, encryption, encoding, and decoding functionalities. An exemplary media server 330 is the Radysis Convedia CMS-12000.

The communications initiated by the participants may originate from different types of communications devices on different types of networks. As shown in FIG. 3, user communication devices 340, 341, 342, 343, and 344 are used to place communications, from Country A, Country B, Country C, Country D, and Country E, respectively, which are received at the media server 330. It is noted that user communication devices 340, 341, 342, 343, and 344 are not limited to the exemplary communication devices shown, and that any suitable communication devices are possible, and from any country.

Figure 4:
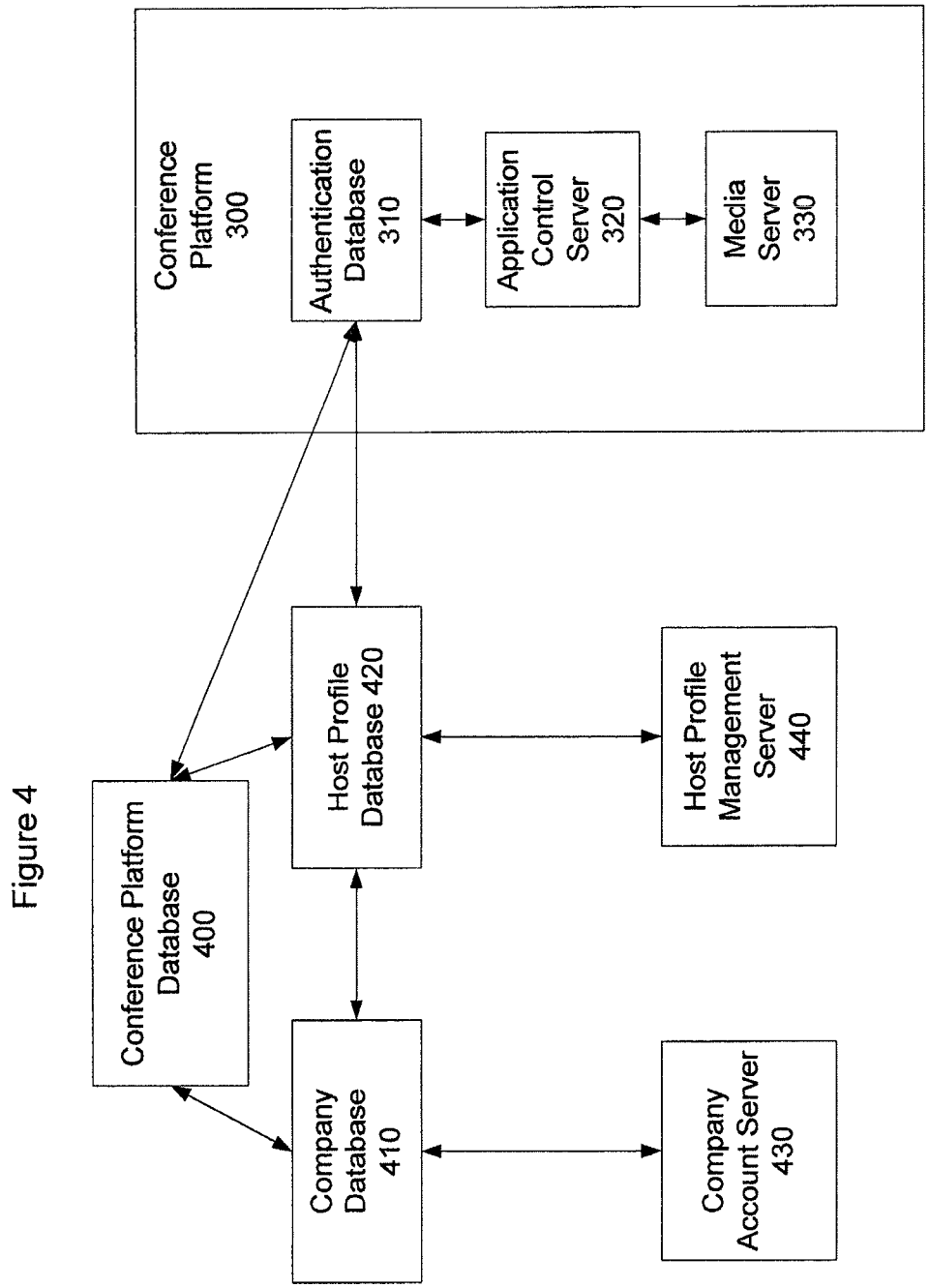
FIG. 4 shows an exemplary schematic of backend components interfacing with the conference platform, according to an aspect of the present disclosure.

FIG. 4 illustrates an exemplary schematic of backend components interfacing with the conference platform according to an aspect of the disclosure. The backend system includes a conference platform database 400, a company database 410, a host profile database 420, a company account server 430, and a host profile management server 440.

The conference platform database 400 contains the profiles of all of the audio conference platforms. The conference platform profiles contain communications addresses such as phone numbers (and associate access information such as access type such as toll and toll free access, and carrier information), host access codes, and participant access codes that the service provider has provisioned for the service. The conference platform database 400 contains the available host and participant access codes. The company server 430 is used to configure company profiles (name address, contact information), the contracted/provided conference services and conference options which are stored in the company database 410. The company server 430 is used to configure the company profile, conference services and conference options and stored them in the company database 410. The conference services in the company database 410 are associated to a conference platform. The audio conference communications addresses (i.e., provider communication addresses) are used by a requester to request an audio conference. The company account server 430 receives information from a service provider communications device or client via the Internet or other network, as will be discussed below.

The host profile management server 440 is used to configure host profile information (name, address, email, contact information) and associated company profile, which are stored in the host profile database 420. The host will procure a conference account which is obtained from the conference platform profile associated by the company account profile. Once the host conference account is procured, the host account with the associated host and participant access code are sent to the authentication database 310 and are unavailable in the conference platform database 400. In this regard, the conference platform profile information is stored in the host profile database 420, which includes names of all of the users or hosts and their associated audio conference communications addresses, access codes for each audio conference communications address, and participant access codes for each audio conference communications address.

Once the service provider provisions the host profile with an audio conference profile (audio conference communications address, access codes for each audio conference communications address, and participant access codes for each audio conference communications address) for the host, the host may then access their own host conference account and provision their user preferences. The information provisioned by the service provider through the host profile management server 440 is transmitted to the host profile database 420 through a communications network such as the Internet, LAN, WAN, etc., for all of the hosts associated with a company account. Then, the information provisioned by the service provider is transmitted through a communications network Internet, LAN, WAN, etc. to the host profile database 420, where each host may access their own account through the host profile management server 440. That is, the user can access the host profile management server 440 via a graphical user interface using a communications device via the Internet or other network, as will be discussed below. Alternatively, the company or agent acting on behalf of the user can provision the user's preferences. The audio conference communications address, access codes, participant access codes, pre-authorized countries, pre-authorized first communications address, pre-authorized IP addresses, and pre-authorized second communications addresses are transmitted to the authentication database 310 from the host profile database 420.

In an embodiment, the conference platform database 400, the company account server 430, the company database 410, the host profile database 420, the host profile management server 440 and/or any of the components of the conference platform 300 including the authentication database 310, the application control server 320 and/or the media server 330 may be implemented in a cloud-based computing environment. For example, the cloud-based computing environment may include a network of servers and web servers that provide processing and storage resources.

It is to be understood that the conference platform database 400, the company account server 430, the company database 410, the host profile database 420, the host profile management server 440 and/or any of the components of the conference platform 300 including the authentication database 310, the application control server 320 and/or the media server 330 each need not be single components, but can each be parts of distributed systems or networks.

It is noted that the enhanced authentication may include only one additional validation, such as pre-authorized countries from which to initiate a global audio conference, a pre-authorized first communications address (such as a telephone number) from which to initiate a global audio conference, a pre-authorized IP address from which to initiate a global audio conference, a pre-authorized second communications address (such as an email address) associated with a user requesting to initiate a global audio conference, or other pre-authorized identifying information as specified in advance by the user. Further, during provisioning, the user has the discretion and option to layer as many of the validation methods as desired, in order to fully customize the user's level enhanced authentication. That is, the user may wish to layer multiple methods of validation, for example, using two methods of validation in addition to the access code, e.g., such as pre-authorized countries from which to initiate a global audio conference and a pre-authorized IP address from which to initiate a global audio conference. While country of origin is generally the first enhanced authentication method, the user can also determine the sequence that they prefer the validation methods to be performed by the system. This is also specified by the user during the provisioning process as will be discussed in greater detail below.

By using more than one authentication measure, the present system can provide multiple security levels that can thwart other hacking methods including VoIP caller ID spoofing, where an individual other than the user is spoofing the user's IP address.

Another method of authentication is to utilize a computer network user id and password (e.g., that a user uses to login to a computer or network) to identify the name or email address of the invited user and authorize conference access to the user based on the user receiving the conference invitation. The conference invitation is sent to participants of the conference call at a given date and time. When the conference starts the users could access the conference via voice over computer. In this exemplary embodiment, the user is authenticated by the computer network, and the invitation matches the name or email address of the user based on the respective computer network credentials.

Figure 5A:
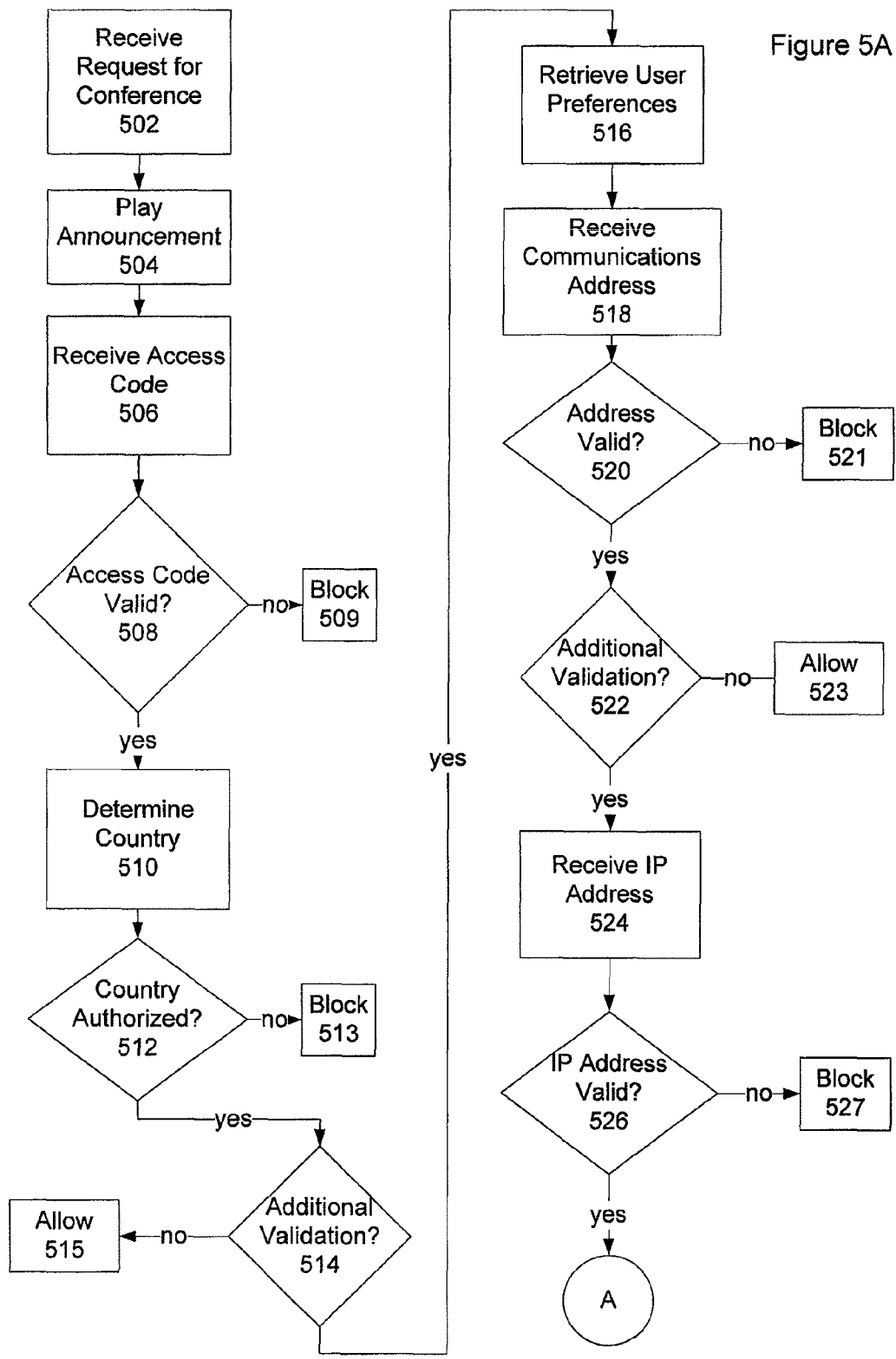
FIG. 5A shows an exemplary flowchart diagram for authenticating a request for a global audio conference, according to an aspect of the present disclosure.
Figure 5B:
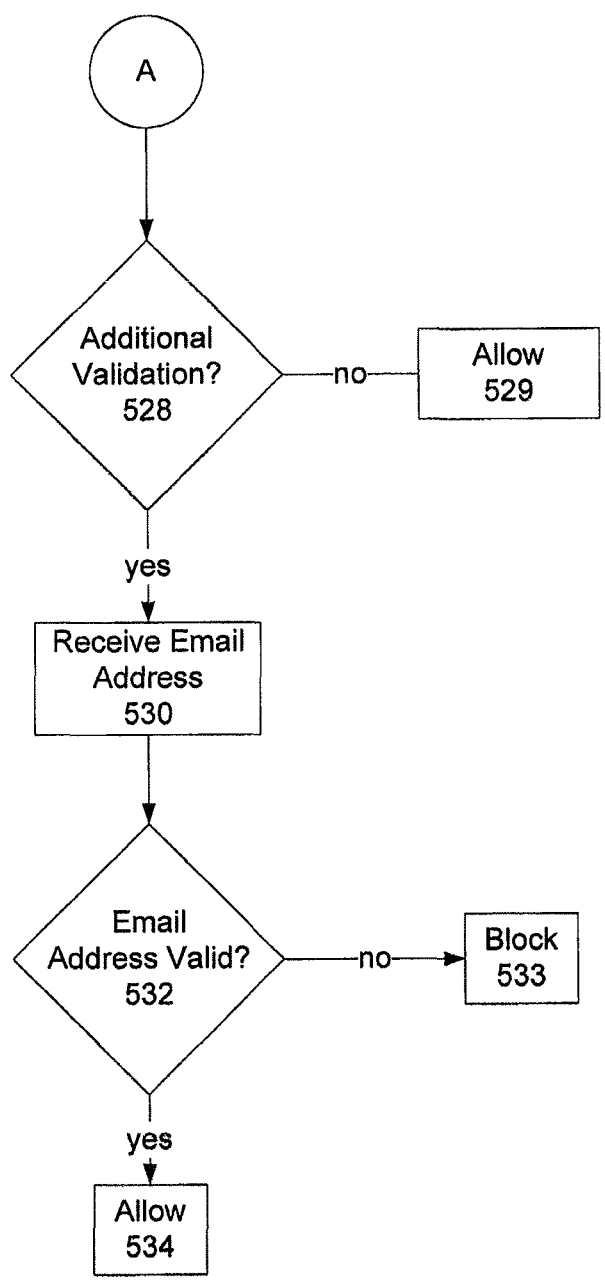
FIG. 5B shows the continuation of the exemplary flowchart diagram of FIG. 5A for authenticating a request for a global audio conference, according to an aspect of the present disclosure.

FIGS. 5A and 5B are a flow diagram illustrating an exemplary authentication process according to an aspect of the present disclosure. At step 502, the conference platform 300 receives a communication initiated by a requester to host a global audio conference. The application control server 320 instructs the media server 330 to play a welcome announcement to the requester at step 504. The welcome announcement includes a message requesting that the requester specify an access code in order to host the global audio conference. At step 506, the application control server 320 receives the access code specified by the requester.

At step 508, the application control server 320 queries the authentication database 310 in order to validate the access code. If the authentication database 310 includes an access code for the provider communications address provided by the requester to initiate the communication, that matches the access code received from the requester at step 506 (step 508=YES), the access code is validated and control proceeds to step 510. If the access code received from the requester at step 506 does not match the access code retrieved from the authentication database for the particular provider communications address user (step 508=NO), then the request to initiate the global audio conference is blocked or denied at step 509. In an alternative embodiment, the application control server 320 may instruct the media server 330 to request that the requester enter another access code, and step 508 is repeated. Additionally, in an alternative embodiment, step 508 attempts to match the access code specified by the requester with a particular host, rather than with a particular provider communications address.

At step 510, the country from which the requester has initiated the request to host the audio conference is determined. At step 512, a determination is made as to whether the country from which the requester has initiated the request to host the global audio conference has been pre-authorized by the host for the host account associated with the service provider particular communications address, e.g., a pre-authorized country. If the country from which the communication originated is not a pre-authorized country for the host account (step 512=NO), then the conference call is blocked at step 513. Otherwise, if the country from which the communication originated is determined to be a pre-authorized country (step 512=YES), control proceeds to step 514.

In order to determine the originating country, the service provider typically employs a dial number identification service (DNIS). That is, the service provider will assign each country a DNIS value. In one embodiment, the service provider may also use the DNIS value for billing a leg on the conference call. In any event, DNIS values are parsed against the access list of valid DNIS values and logic in the application server 320 can determine whether a match exists, before allowing the calling party to initiate the conference. As is known, the International Telecommunications Union (ITU) assigns country codes to each country. If a local toll free number called, the originating carrier will convert the number to an internal network routing number, which may or may not be an e.164 number, depending on the originating and terminating carrier capabilities.

Other methods may be used to determine the originating country. This functionality is also performed at the application control server 320. For example, the number may be obtained from the country calling codes defined by e.123 and/or e.164 addresses, and are often referred to as international direct dialing (IDD) or international subscriber dialing (ISD) codes. For example, the country code of the caller may be extracted from the e.123 and e.164 information associated with the call. Generally, the country code is embedded within the e.123 and e.164 number. When configuring the phone number routes to the conference platform, the routing profile includes country code routing indicators. Those indicators identify the country where the call originates. The country code identifier is used as a filter as an additional host validation.

In any event, if the user has not authorized a country in the host account during the aforementioned provisioning process, also discussed in greater detail below, and the user later attempts to host an audio conference from that country, the system will not allow the audio conference to be established. For example, if during the provisioning process, the user has authorized (or enabled) only Italy and Germany, and the user later attempts to host an audio conference from France, then the system will prevent the audio conference from being established. Conversely, if the user attempts to host an audio conference from a country in which the user has pre-authorized during provisioning, such as Italy or Germany, then the system will establish the audio conference bridge after determining that the user initiated the communication from either Italy or Germany.

At step 514, system determines from the authentication database 310 whether the host activated additional layers of security with respect to the host account. If not (step 514=NO), the audio conference bridge is established at step 515. If so, (step 514=YES), then the host account preferences are received from the authentication database at step 516.

In the example shown, the telephone number associated with the device from which the requester has requested to host the global audio conference is received, at step 518. At step 520, a determination is made as to whether the determined telephone number is pre-authorized on the host account. If the telephone number associated with the device from which the requester has requested to host the global audio conference is not pre-authorized (step 520=NO), then the request to host the global audio conference is blocked at step 521.

The telephone number associated with the device from which the requester has requested to host the global audio conference is determined by caller identification (CID) methods. Alternatively, the telephone number could be determined by, for example, prompting the user to specify the telephone number via DTMF, spoken word, or other methods. Additionally, companies also have a private branch exchange (PBX) that passes the CID information.

If the telephone number associated with the device from which the requester has requested to host the global audio conference the conference call is initiated is determined to be pre-authorized in the host account (step 520=YES), then control proceeds to step 522. At step 522, the application control server 320 determines from information retrieved from the authentication database whether the user has additional validation preferences associated with the host account. If no additional preferences are associated with the host account (step 522=NO), the audio conference bridge is established at step 523. If there are additional validation preferences associated with the host account (step 522=YES), then a subsequent security/validation process is performed.

At step 524, the IP address associated with the device from which the requester has requested to host the global audio conference is received. At step 526, a determination is made as to whether the received IP address is pre-authorized in the host account. If the received IP address is not pre-authorized (step 526=NO), the request is blocked at step 527. If the IP address received is determined to be pre-authorized (step 526=YES), then control proceeds to step 528. The IP address associated with the device from which the requester has requested to host the global audio conference is determined by caller ID (CID) methods, including VoIP caller id. Alternative methods include receiving an SIP message, for example, an SIP INVITE message emitted from the requestor's communication device. For example, when the SIP message is received at the conference platform 300, the application control server 320 performs and ID challenge of the SIP message, requesting that the requestor's communication device provide identifying credentials. In response, the requestor's communications device responds with an SIP message including identifying credentials including the IP address of the requestor's communication device.

IP addresses, as contemplated herein include, but are not limited to IPv4, IPv6, unique local addresses, link-local addresses, public IP addresses, virtual IP addresses, etc. The IP address may be identified by country using IP geo-location services. When an IP address is sent via the Internet, geo-location services can identify the country location the IP address originated.

At step 528, a determination as to whether the host has additional validation preferences associated with their host account is made by the application control sever 320. If no additional preferences are associated with the host account (step 528=NO), the audio conference bridge is established at step 529. If there are additional validation preferences associated with the host account (step 528=YES), then a subsequent security/validation process is performed at step 530.

In the example shown, an email address associated with the requester attempting to host the global audio conference is received, at step 530. The email address is received by the application control server 320 in response to a prompt by the media server 330 acting under the direction of the application control server 320. That is, the requester would provide an email address, associated with their account, in response to the prompt, by spoken word, DTMF, email, text message, via a GUI-based web interface, etc. Alternatively, a determination of the email address associated with the requester attempting to host the global audio conference can be made, for example, if the requester is using a smartphone. In addition to email address validation discussed above, the user can login to their device, similar to logging into a computer network, using a smart phone into a phone network. The name or email address of the user can be obtained from the device as an authentication method to access the conference.

At step 532, a determination is made as to whether the email address is a pre-authorized email address for the host account associated with the user or service provider communications address. If the email address specified by the requester requesting to host the global audio conference is not pre-authorized (step 532=NO), then the request to host the global audio conference is blocked at step 533. On the other hand, if the email address specified by the requester is determined to be pre-authorized (step 532=YES), then control proceeds to step 534 where the global audio conference is allowed and the conference bridge is established in a known manner.

FIG. 6 is an exemplary host profile management graphical user interface. The host profile management graphical user interface 600 includes a host account name column 601, a service provider conference communications address column 602 a leader access code column 603, a participant access code column 604, a country column 605, a first communications address column 606, an IP address column 607, an second communications address column 608, a sequence row 609, and an add border(s) row 610. The graphical user interface 600 is accessible by a user over a communications network such as the Internet, wireless network, satellite network, LAN, WAN, Wi-Fi, or other network suitable for wireless or wired transmission of data, and allows the user to set up preferences on their account. The graphical user interface 600 is accessible by the user by accessing the host profile management server 440, which stores the user profile in the host profile database 420.

The host account name column 601 includes the host account name of the host (i.e., user), in this case, Bob Smith is the host account name. The service provider conference communications address column 602 includes the telephone number or audio conference communications address that Bob Smith and any participants to conference call to which Bob Smith hosts can specify to request to be placed in conference. The leader access code column 603 includes the leader access code that Bob Smith will specify in order to initiate a conference call. The participant access code column 604 includes participant access codes, which Bob Smith can provide to persons with whom he has scheduled a conference call in order that they may join an audio conference. Columns 601-604 are preferably pre-populated when the service provider provisions the account of the company and under that, the individual host accounts such as that for Bob Smith. Thus, when Bob Smith logs in to the host profile management interface 600, he does not need to enter the information in columns 601-604. Alternatively, the information in columns 601-604 may be entered by Bob Smith, an agent of the service provider, or company may enter the host name on behalf of the user.

In the event that more than one user is assigned to a particular servicer provider conference communications address, also referred to herein as audio conference communications address or service provider communications address, then the more than one user would each have a unique leader access code. Thus, the pre-authorized country, pre-authorized first communications address, pre-authorized IP address, and pre-authorized second communications address are associated with the leader access code 603, rather than the service provider conference communications address. However, if the same audio conference communications address is not assigned to more than one user, then the pre-authorized country, pre-authorized first communications address, pre-authorized IP address, and pre-authorized second communications address are associated with the audio conference communications address. In this regard, the leader access code is an identifier associated with the global audio conference account provisioned by the service provider. Alternatively, the provider communications address, the host name, or other identifier is an identifier associated with the global audio conference account provisioned by the service provider.

Columns 605-608 contain input areas that the user can populate to set preferences for the enhanced security authentication features, i.e. pre-authorized fields. The country column 605 contains an input area for the user to enter at least one country from which they are authorized to host global audio conferences. The first communications address column 606 contains an input area for the user to enter at least one pre-authorized communications address, such as a telephone number, associated with a device from which they are authorized to host global audio conferences. The IP address column 607 contains an input area for the user to enter at least one pre-authorized IP address associated with a device from which they are authorized to host global audio conferences. The second communications address column 608 contains an input area for the user to enter at least one pre-authorized second communications address, such as email address, that can be used to provide validation when the user requests to host a global audio conference.

Of course, other columns can be included in the host profile management graphical user interface that include additional input areas that the user can use to input information that is used to provide validation when the user requests to host a global audio conference. For example, a column could be included that allows the user to specify any other identifying information such as an employee identification number, SIP address of a communications device, media access control (MAC) address of a communications device, etc.

Sequence row 609 allows the user to define in what order the respective validation methods are performed by the application control server 320, in a layered scenario. In the example shown, after the access code has been validated, the country from which the request to host the conference call has originated is checked. That is, the sequence identifiers "1", "2", "3", and "4" provided by Bob Smith specify to the application control server 320 the order in which the security steps are performed. The next validation to be performed in the example shown is the IP address associated with the device from which the user has used to host the conference call. After the IP address has been validated, the next validation to be performed is the telephone number or first communications address associated with the device from which the user has used to host the conference. The next validation to be performed in the example shown is the email address or second communications address input by the user. That is, the media server 330 will prompt the user to speak the user entered email address before allowing the conference call to be established. When entering the information in sequence row 609, the user has the option of turning off any number of validation methods by, for example, entering a "0" in the respective column, rather than a sequence identifier such as a "1", "2", "3", or "4" as shown in the example provided.

The border row 610, when checked "√" by the user, automatically adds bordering countries to the group of pre-authorized countries, as discussed in greater detail below. That is, the interface provides the user with the option of setting geographically surrounding countries as authorized countries in the access list. For the example given, if Italy is set by the system as the default country, or if the user selects Italy, then the bordering countries of France, Switzerland, Austria, and Slovenia would automatically be added as authorized countries and thus added to the pre-authorized list of countries in the host account shown in FIG. 6. This functionality is performed by the host profile management server 440. In this fashion, a host that spends a large amount of time in Italy would also be able to initiate global audio conferences from the neighboring countries of France, Switzerland, Austria, and Slovenia. At the option of the user, the feature of automatically adding bordering countries to the group of pre-authorized countries could be deactivated by the user by deselecting the input area in row 610.

In one embodiment, during initial account setup by the service provider, the host country preferences may be set to a default country, for example, Italy or the United States; although, any default or automatic setting can be overridden and changed by the user, as needed.

As discussed, the conference call system provides added authentication procedures for a requester attempting to initiate and host a global conference call. In another embodiment, the conference call system provides the same added authentication procedures for those attempting to participate in a conference call scheduled by a host. In this fashion, unauthorized individuals would be prevented from surreptitiously joining a global conference call. In this regard, the authentication process can be the same as discussed with respect to an individual attempting to host a global conference call. In one embodiment, the host, company, or other representative can define a list of authorized countries, participant telephone numbers, participant email addresses, participant communications addresses, and/or participant IP addresses, which are provisioned in the authentication database by the host prior to, or at the time of scheduling the global conference call.

In addition to the user, an administrator and/or an authorized user may configure, manage, setup, and provision the user's preferences, also known as the host profile, on the host profile management interface of the host account. That is, user, the administrator or authorized user may implement and access global audio conferencing services, using the graphical user interface (GUI) via the Internet, or via an interactive voice response (IVR) system via the public switched telecommunications network (PSTN) or packet switched network.

The information on the user's host account includes information for providing global audio conference services and enables the service provider to bill the users, or the company of the users) for the service. The country preference is used to determine which country the host dial in access information is presented to the host upon registration.

In order to register for a conference account, a user can self-register via a web-based application, register via email, or contact a customer care representative of the service provider. Additionally, bulk registration on behalf of multiple hosts is also an acceptable form of registration. In this regard, a customer care representative can assist a user setting up preferences, and can also confirm and/or update the user's preferences.

The system is also configured to permit rules and filters governing the accessibility and provisioning of the user's preferences on the host account. That is, the host profile management server 440 would prevent any access to the host profile management interface 600 according to a set of rules and/or filters. For example, access to a user's host account preferences (i.e., profile) can include time of day filters, in which access to the user's profile of preferences would be prevented during hours outside of those established by system default or by the user. Additionally, access to the user's profile of preferences would optionally be limited to weekdays only. Still further, access to the user's profile of preferences would optionally be limited to normal business hours of any country on the host account pre-authorized countries of the user. For example, if the sole pre-authorized country is set to Germany, then then access to the user's profile of preferences would optionally be limited to 0900 hours to 1700 hours German time.

Figure 7:
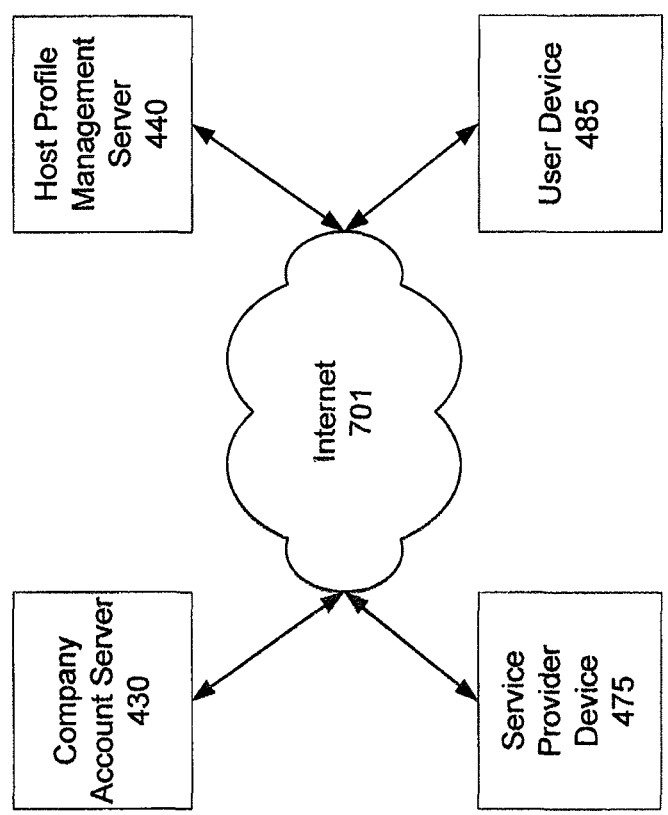
FIG. 7 shows an exemplary communications network for provisioning the global audio conference system, according to an aspect of the present disclosure.

FIG. 7 illustrates an exemplary diagram showing interaction between network nodes used to provision the global audio conference system. In addition to the company account server 430 and the host profile management server 440, a service provider device 475, and a user device 485 are included.

The service provider device 475 includes any computing device having a processor able to communicate with the company account server 430, for example, via the Internet 701, LAN, WAN, or other suitable network. After the service provider agrees to provide audio conferencing services to the company, a representative of the service provider uses the service provider device 475 to log in to the company account server 430 via the Internet and provision the audio conference service, to set up the company account, under the umbrella of which at least one host conferencing account is provisioned, i.e., Bob Smith, referring to FIG. 6. The accessing and login procedure for provisioning by the service provider is similar to that described below with respect to a user logging into the host profile management server 440 to provision their host account. In any event, the provisioning by the service provider typically includes providing the company with a specified number of host audio conference communications addresses, audio conference communications address access codes, participant communications addresses, and participant access codes. That is, the service provider associates each audio conference communications address assigned to the company with one more leader access codes. In this regard, there may be a one to one relationship of provider communications addresses to leader access codes, or there may be multiple leader access codes associated with a single provider communications address. Additionally, the service provider associates participant access codes with the leader access codes. In an alternative embodiment, the participant access codes and the leader access code may be one and the same for a given user.

As shown in FIG. 4, information provisioned by the service provider on the company account server 430 is transmitted over a communications network such as the Internet, a LAN, a WAN, etc. to the company database 410. At any time later, this information is transmitted over a communications network such as the Internet, a LAN, a WAN, etc. to the host profile database 420 where it is made available on the host profile database 420 for each user or host to specify their own account preferences.

Once the service provider provisions the audio conferencing service on the company account server 430, the user, can provision the host account preferences using the user device 485 which is any device able to communicate with the host profile management server 440, for example, via the Internet 701 or other suitable network.

Thus, the user is able to interact with the host profile management server 440 shown in FIG. 4. More specifically, the user is able to access the host profile management server 440 via the Internet or an IVR. For example, the user can access the host profile management interface 600 by accessing a unique URL. Similarly, the service provider can provision the audio conferencing service on the company account server 430 by accessing a unique URL.

In order to access global audio conference service, the user must log-on to the host profile management server 440 from a client device through the Internet 44. This step incorporates use of any compatible web browser, such as such as Microsoft Internet Explorer. In an embodiment, the user device 485 also incorporates global audio conference service enabling software. Once on the Internet 701, the user connects to the host profile management server 440. The host profile management server 440 receives HTTP messages from the user device 485 and provides an HTML web page in response to the user's input. The web page relates to the user's global audio conference service preferences.

Once connected to the host profile management server 440, the user must provide authentication information to access the corresponding host account, through the host profile management server 440. The company account server 430 performs the authentication. After receiving the account number and associated PIN from the subscriber via the host profile management server 440, the company account server 430 retrieves the authentication data to confirm that the host is an authorized user.

After successful authentication, the host profile management server 420 retrieves the current service data on the host account for the global audio conference service of the host from the host profile database 420. This includes the information from the host profile management interface 600. That is, the host profile database 420 transmits information from the user's host account profile to the user device 485 so that the user can provision and/or make changes to their account. Any changes to the user host account are transmitted from the user device 485 to the host profile management database 420 and to the authentication database 310, via a communications network such as the Internet 701.

The user is presented with a number of options in the host profile management interface 600. For example, the user can add, delete, and/or modify any pre-authorized list. Once the changes have been entered by the user and transmitted from the host profile management server 440 to host profile database 420 via the Internet, the host profile database 420 transmits the updated data to the authentication database 310, also via the Internet.

The user can alternatively interact with host profile management server 440 using an IVR. Using speech recognition capabilities of the IVR, the user can navigate through nested menus to access the user's host account profile.

For example, the user calls a toll free number from any DTMF telephone, which directly accesses the IVR connected to the host profile management server 440. The IVR receives the call and initiates a request for authentication information, including the account and PIN number. Authentication information is provided using the touch tone from the key pad of the DTMF telephone. The IVR forwards the information to the conference platform authentication database 310, which in turn verifies the authorization.

After verification, the system operates in much the same way as described above with respect to a GUI and the Internet. Specifically, the company account server 430 retrieves account information, including the host account profile preferences. The host profile management server 440 provides the account information to the IVR, which verbally recites a menu of options to the user. For example, if the user has previously provisioned a pre-authorized list, the list will be verbally recited to the user. Then, the user listens to the options and inputs various choices via the telephone touch tone key pad, including, for example adding, deleting, and/or modify one or more items on the access list. The menu also provides the user with an opportunity to add, delete, and/or modify the access list of other hosts.

The IVR forwards the new pre-authorized preferences, and other preferences, or an updated list of preferences, for a particular host to the host profile database 420. The host profile database 420 sends the information to the authentication database 310 via the Internet.

Accordingly, the present invention enables an audio conference system and method of providing an audio conference system having enhanced security and authentication, and method and system of provisioning the audio conference system with enhanced security and authentication. Thus, the present method and system will reduce or eliminate unauthorized audio conferences and instill confidence in user of the services offered by the service providers. Further, the enhanced security and authentication method and system described herein can thwart attempts by hackers and could force hackers to abandon their attempts at accessing conference systems.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

Further, while various authentication methods have been disclosed herein, including country, telephone number, IP address, and email address, others are possible. For example, the host profile management server, or any other processor connected directly or indirectly thereto, could be equipped with voice signature software that creates and stores a voiceprint of the user's voice in, for example, the host profile database 420, which is subsequently transmitted to the authentication database 310. A biometric voiceprint of the user is created, which is less susceptible to ambient noise, fluctuations in the user's voice at the time of enrollment, etc.

Then, when the requester attempts to host a conference call, the media server prompts the user to provide spoken word. Then, voice recognition/authentication software of the application control server 320, using biometric voiceprint technologies, compares the previously enrolled voiceprint for the user, with that of the requester, to determine whether a match exists.

Figure 8:
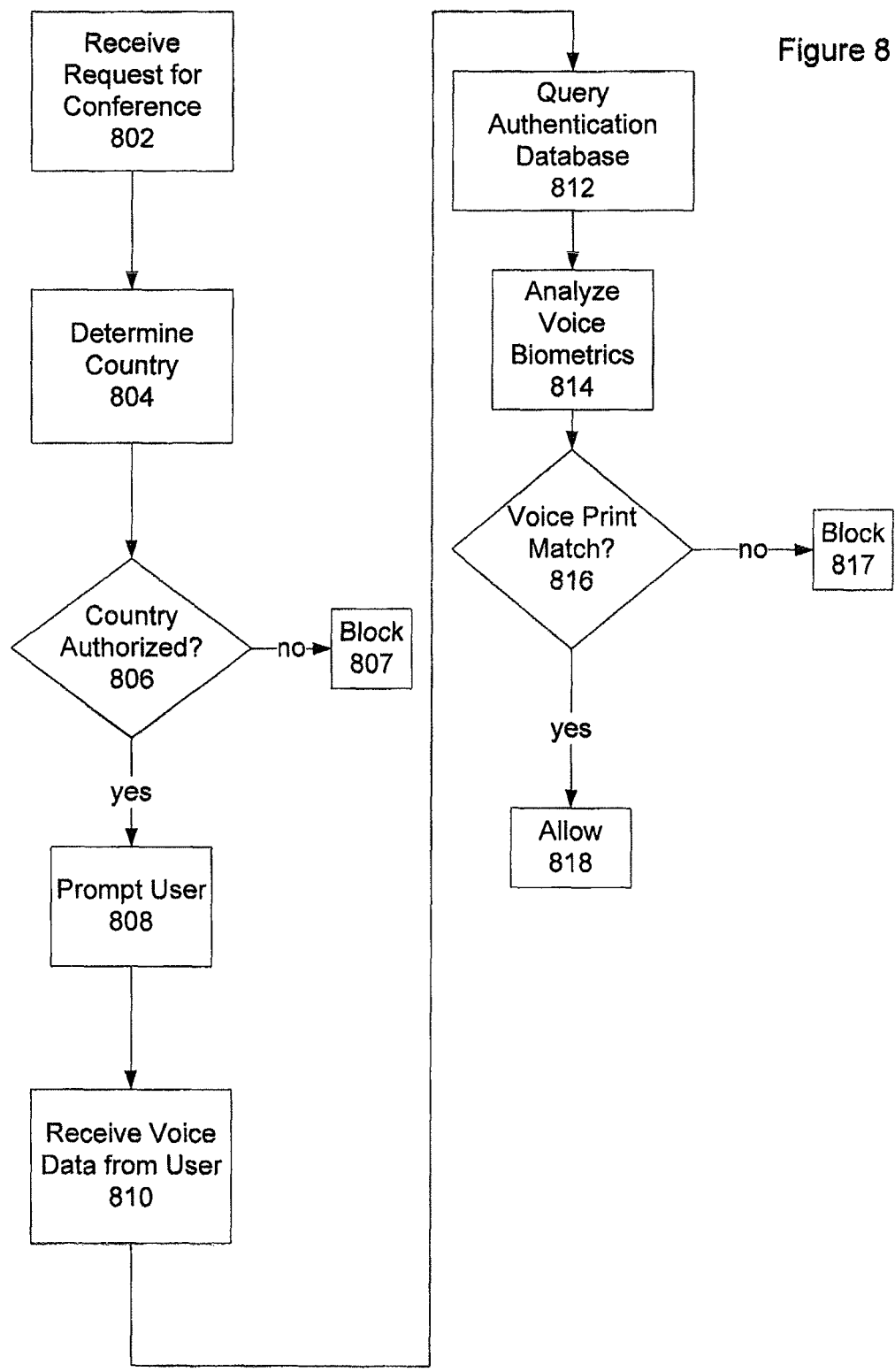
FIG. 8 shows another exemplary flowchart diagram for authenticating a request for a global audio conference, according to an aspect of the present disclosure.

For example, FIG. 8 shows an exemplary flowchart diagram for authenticating a request for a global audio conference, according to another embodiment of the present disclosure. The example shown in FIG. 8 is a layered system that combines the country of origin validation method described above, with a biometric method.

That is, at step 802, the conference platform 300 receives a communication placed by a requester to an audio conference communications address, in order to request to host a global audio conference. At step 804, the country from which the requester has initiated the request is determined, in a manner described above. At step 806, a determination is made as to whether the country from which the requester has initiated the request to host the global audio conference is a pre-authorized country. If the country from which the requesting communication originated is not a pre-authorized country in the host account (step 806=NO), then the request for an audio conference is blocked at step 807.

If the country from which the communication originated is a pre-authorized country for the user in the host account (step 806=YES), then control proceeds to step 808, where the requester is prompted by the media server 330 under instructions from the application server 320. The prompt solicits voice input on the part of the requester, for example, asking the requester his name or other identifying information such as a password or personal identification number (PIN). At step 810, the application server 320 receives voice data from the requester. At step 812, the application server queries the authentication database 310 to retrieve a stored biometric voice print associated with the user name or identification number provided by the requester. At step 814, the application control server 320 attempts to verify the requester's identity by comparing the requester voice data at step 810 with stored biometric voice print data of the host account associated with the provider communications address and/or leader access code. That is, the application control server 320 includes the necessary hardware and software to compare the biometric voice print data with the user's speech captured at step 810. The media server 330 actually captures and compares the voice print data. The media server 330 captures the initial voice print data and subsequent authentications to join a conference will be captured and compared to the stored voice print data. In this regard, the user, during the provisioning process discussed with respect to FIGS. 6 and 7 would have previously provided a speech sample from which a biometric voice print was generated by software on the host profile management server 440 and transmitted to the host profile database 420 and to the authentication database 310 via a communications network such as the Internet. The biometric voice print becomes part of the host account profile and/or authentication database 310.

At step 816, if the application control server 320 determines that a match exists between the requesting user and the stored biometric voice print (step 816=YES), then the global audio conference is allowed to proceed and a conference bridge is established at step 818. On the other hand, if a voice print does not match between the requesting user and the stored biometric voice print (step 816=NO), then the global audio conference is blocked at step 817.

Additionally, while a global audio conference system has been discussed, other types of conferences are possible, such as online conferences, video, and virtual conferences. For example, video conferences, including but not limited to IP, integrated services digital network (ISDN)-based, local area network (LAN), wide area network (WAN), Internet, any of the digital subscriber line technologies including xDSL, and virtual private network (VPN) video conferences are contemplated.

The audio, video, and virtual conferences contemplated herein include but are not limited to business sessions and functions, data editing and manipulating sessions and functions, gaming sessions and functions, imaging sessions and functions, shopping sessions and functions, scheduling sessions and functions, multimedia sessions and functions, diagnostic and medical sessions and functions, and customer service sessions and functions, and financial sessions and functions. Further, the conference system may be used to provide secure financial conferences and secure transactions between multiple parties in the financial services environment.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmission (e.164, e.123, IPv4, IPv6, H.323, H.248, MGCP, SIP, RTP, RTCP, SRTP, SDP, IAX, XMPP, skype, RSVP-TE, LDP, BGP) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of authenticating a request to host a conference in a communications network, comprising:
   receiving, at a conference platform, a communication from a network node of a requester requesting to host a global audio conference, the communication including an access code specified by the requester;
   determining whether the access code is a valid access code associated with a provider communications address specified by the requester;
   identifying, with a processor, a country from which the communication of the requester originated;
   determining, with the processor, whether the country from which the communication of the requester originated is a pre-authorized country, associated with a host account, from which to host the global audio conference; and
   when the access code specified by the requester is determined to be a valid access code associated with the provider communications address specified by the requester, when the country from which the communication of the requester originated is determined to be a pre-authorized country, associated with the host account, from which to host the global audio conference, and when an authentication is performed in a computer network accessed by the requester using the network node by utilizing a computer network user id and a password to identify a name or email address of the requester and authorize conference access to the requester based on the requester receiving a conference invitation, wherein the requester can access the conference via voice over computer using the network node when the requester is authenticated by the computer network using the computer network user id and the password, and the conference invitation matches the name or email address identified of the requester based on the computer network user id and the password,
   establishing the global audio conference.

2. The method according to claim 1, further comprising:
   identifying a communications address associated with the requester of the communication; and
   determining whether the communications address associated with the requester of the communication is a pre-authorized communications address from which to host the global audio conference.

3. The method according to claim 2, further comprising:
   identifying an internet protocol address associated with the communication; and
   determining whether the internet protocol address associated with the communication is a pre-authorized internet protocol address from which to host the global audio conference.

4. The method according to claim 3, further comprising:
   identifying a second communications address associated with the requester of the communication; and
   determining whether the second communications address associated with the requester of the communication is a pre-authorized second communications address associated with the host account.

5. The method according to claim 3, further comprising identifying an originating country associated with the internet protocol address using geo-location data.

6. The method according to claim 1, wherein the country from which the communication of the requester originated is determined with a dialed number identification service.

7. The method according to claim 1, wherein the country from which the communication of the requester originated is determined by extracting a country code from an e.164 number associated with the communication from the requester.

8. The method according to claim 2, wherein the communications address of the requester comprises an originating phone number.

9. The method according to claim 4, wherein the second communications address of the requester comprises an email address, and wherein the second communications address is obtained by prompting the requester.

10. A system for authenticating a request to host an audio conference in a communications network comprising:
    a processor; and
    a memory including instructions that, when executed by the processor, cause the processor to perform operations including:
    receiving, at a conference platform, a communication from a network node of a requester requesting to host a global audio conference, the communication including an access code specified by the requester;
    determining whether the access code is a valid access code associated with a provider communications address specified by the requester;
    identifying a country from which the communication of the requester originated and determining whether the country from which the communication of the requester originated is a pre-authorized country, associated with a host account, from which to host the global audio conference; and
    when the access code specified by the requester is determined to be a valid access code associated with the provider communications address specified by the requester, when the country from which the communication of the requester originated is determined to be a pre-authorized country, associated with the host account, from which to host the global audio conference, and when an authentication is performed in a computer network accessed by the requester using the network node by utilizing a computer network user id and a password to identify a name or email address of the requester and authorize conference access to the requester based on the requester receiving a conference invitation, wherein the requester can access the conference via voice over computer using the network node when the requester is authenticated by the computer network using the computer network user id and the password, and the conference invitation matches the name or email address identified of the requester based on the computer network user id and the password, establishing the global audio conference.

11. A non-transitory tangible computer readable storage medium encoded with an executable computer program that authenticates a request to host a conference in a communications network and that, when executed by a processor, causes the processor to perform operations comprising:

receiving, at a conference platform, a communication from a network node of a requester requesting to host a global audio conference, the communication including an access code specified by the requester;

determining whether the access code is a valid access code associated with a provider communications address specified by the requester;

identifying a country from which the communication of the requester originated;

determining whether the country from which the communication of the requester originated is a pre-authorized country, associated with a host account, from which to host the global audio conference; and when the access code specified by the requester is determined to be a valid access code associated with the provider communications address specified by the requester, when the country from which the communication of the requester originated is determined to be a pre-authorized country, associated with the host account, from which to host the global audio conference, and when an authentication is performed in a computer network accessed by the requester using the network node by utilizing a computer network user id and a password to identify a name or email address of the requester and authorize conference access to the requester based on the requester receiving a conference invitation, wherein the requester can access the conference via voice over computer using the network node when the requester is authenticated by the computer network using the computer network user id and the password, and the conference invitation matches the name or email address identified of the requester based on the computer network user id and the password, establishing the global audio conference.

12. The non-transitory tangible computer readable storage medium according to claim 11, further comprising:

identifying a communications address associated with the requester of the communication; and determining whether the communications address associated with the requester of the communication is a pre-authorized communications address from which to host the global audio conference.

13. The non-transitory tangible computer readable storage medium according to claim 12, further comprising:

identifying an internet protocol address associated with the communication; and determining whether the internet protocol address associated with the communication is a pre-authorized internet protocol address from which to host the global audio conference.

14. The non-transitory tangible computer readable storage medium according to claim 13, further comprising:

identifying a second communications address associated with the requester; and determining whether the second communications address associated with the requester of the communication is a pre-authorized second communications address associated with the host account.

15. The non-transitory tangible computer readable storage medium according to claim 11, wherein the pre-authorized country comprises a country selected by a host of the host account and a country bordering the country selected by the host.

16. The non-transitory tangible computer readable storage medium according to claim 11, wherein the country from which the communication of the requester originated is determined with a dialed number identification service.

17. The non-transitory tangible computer readable storage medium according to claim 11, wherein the country from which the communication of the requester originated is determined by extracting a country code from an e.164 number associated with the communication from the requester.

18. The non-transitory tangible computer readable storage medium according to claim 12, wherein the communications address of the requester comprises an originating phone number.

19. The non-transitory tangible computer readable storage medium according to claim 14, wherein the second communications address of the requester comprises an email address.

* * * * *